(12) United States Patent
Godkin

(10) Patent No.: US 6,919,660 B2
(45) Date of Patent: Jul. 19, 2005

(54) LINEAR BRUSHLESS DC MOTOR WITH IRONCORE COMPOSITE ARMATURE ASSEMBLY

(75) Inventor: Mikhail Godkin, San Diego, CA (US)

(73) Assignee: BEL Technologies, Inc., San Francisco, CA (US)

( * ) Notice: Subject to any disclaimer, the term of this patent is extended or adjusted under 35 U.S.C. 154(b) by 0 days.

(21) Appl. No.: 10/116,495

(22) Filed: Apr. 3, 2002

(65) Prior Publication Data

US 2002/0145358 A1 Oct. 10, 2002

Related U.S. Application Data

(60) Provisional application No. 60/282,546, filed on Apr. 9, 2001.

(51) Int. Cl.[7] .................. H02K 3/493; H02K 41/03; H02K 1/18
(52) U.S. Cl. .................. 310/91; 310/12; 310/254
(58) Field of Search .................. 310/12–14, 91, 310/254; 104/281, 283, 285–286, 290–294

(56) References Cited

U.S. PATENT DOCUMENTS

| 3,746,899 A | * | 7/1973 | Eastham | 310/12 |
|---|---|---|---|---|
| 3,770,995 A | * | 11/1973 | Eastham et al. | 104/294 |
| 4,049,983 A | * | 9/1977 | Attwood et al. | 310/13 |
| 4,107,558 A | * | 8/1978 | Brown | 310/13 |
| 4,131,812 A | | 12/1978 | English | 310/13 |
| 4,392,073 A | * | 7/1983 | Rosenberry, Jr. | 310/216 |
| 4,642,493 A | * | 2/1987 | Wallace | 310/13 |
| 4,665,329 A | * | 5/1987 | Raschbichler | 310/13 |
| RE32,654 E | * | 4/1988 | Jackson | 310/156.08 |
| 4,793,263 A | * | 12/1988 | Basic et al. | 104/282 |
| 5,128,569 A | * | 7/1992 | Gladish | 310/12 |
| 5,191,246 A | * | 3/1993 | Roxborough | 310/13 |
| 5,252,877 A | * | 10/1993 | Sawa et al. | 310/214 |
| 5,300,846 A | * | 4/1994 | Miller | 310/12 |
| 5,864,187 A | * | 1/1999 | Gonzalez | 310/12 |
| 6,433,446 B1 | * | 8/2002 | Sedgewick et al. | 310/12 |

FOREIGN PATENT DOCUMENTS

| DE | 4040116 | * | 6/1992 | H02K/1/06 |
|---|---|---|---|---|
| GB | 233838 | | 5/1925 | 7970/24 |
| JP | 4-125054 | * | 4/1992 | H02K/41/02 |
| JP | 05-83924 | * | 4/1993 | H02K/41/03 |
| JP | 10-323012 | * | 12/1998 | H02K/41/03 |
| JP | 2000-308328 | * | 11/2000 | H02K/41/03 |

* cited by examiner

Primary Examiner—Burton Mullins
(74) Attorney, Agent, or Firm—Gray Cary Ware & Freidenrich LLP

(57) ABSTRACT

A stack assembly is disclosed of the type used in linear brushless DC motors, the stack assembly having a base portion, a plurality of teeth extending from the base portion and about which the windings can be positioned, and in which the plurality of teeth are spaced apart from each other so as to define slot openings at ends of and between adjacent teeth, and magnetic material shaped and positionable to enclose one or more of the slot openings between adjacent teeth. Also disclosed is a mounting bracket positionable along the back iron of the stack assembly and shaped so that the ends of the mounting bracket engage with the ends of the stack assembly.

13 Claims, 6 Drawing Sheets

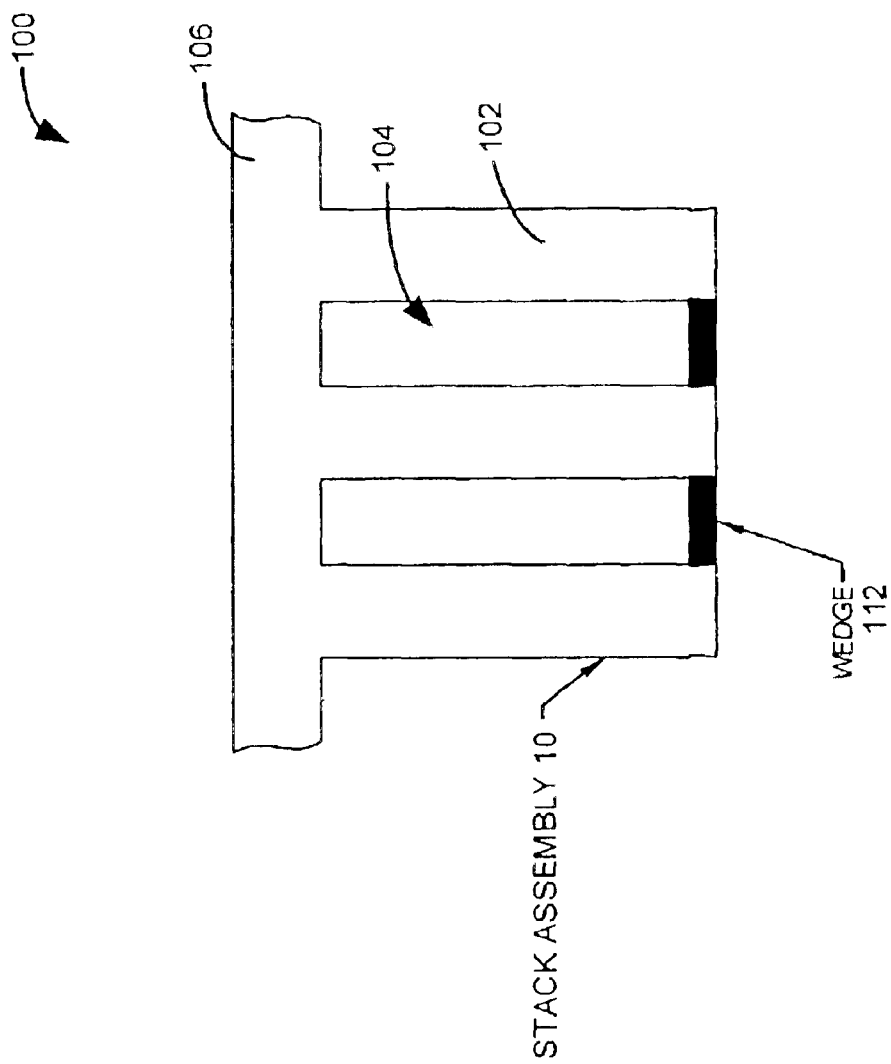

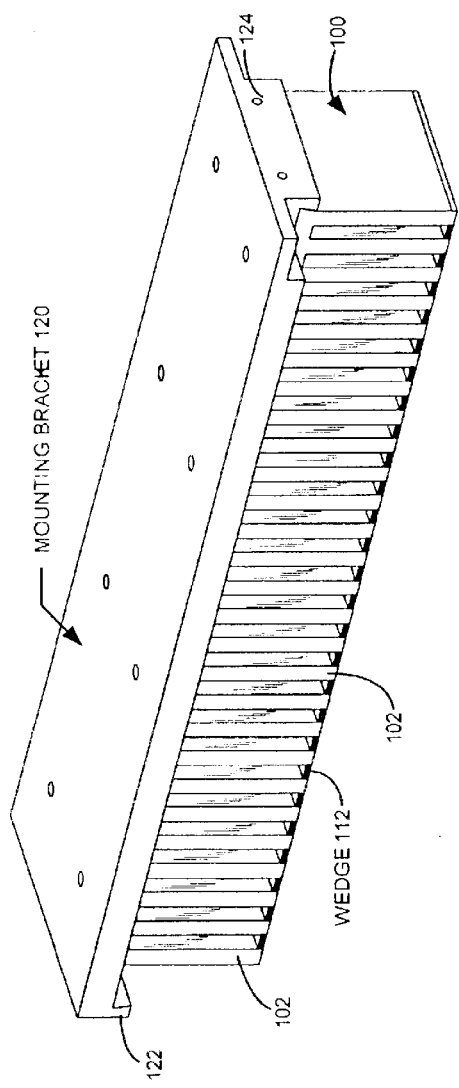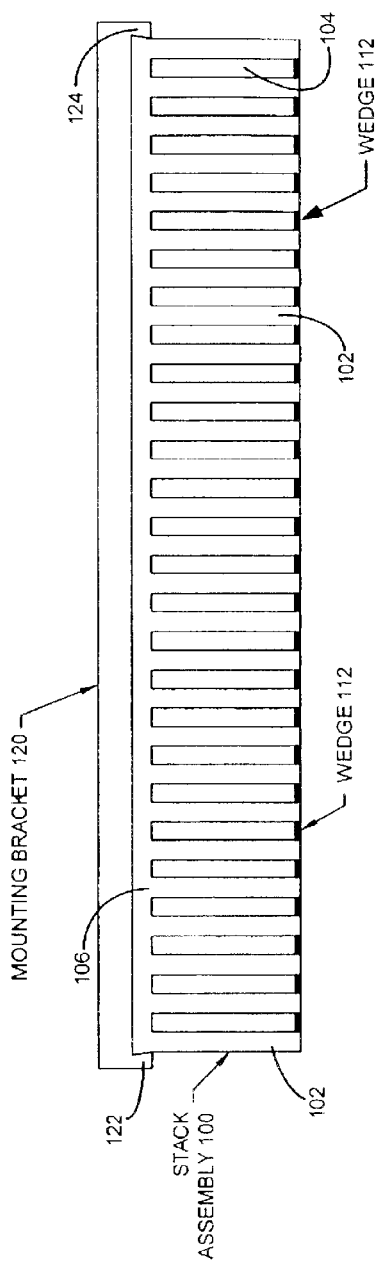
FIG. 5A
FIG. 5B

LINEAR BRUSHLESS DC MOTOR WITH IRONCORE COMPOSITE ARMATURE ASSEMBLY

RELATED APPLICATIONS

The present application claims priority under 35 U.S.C. §119(e) from provisional to application No. 60/282,546, filed Apr. 9, 2001.

TECHNICAL FIELD

The present invention is directed generally to linear brushless DC motors, and in particular to a composite armature assembly for linear brushless DC motors.

BACKGROUND ART

A typical linear brushless motor of a rectangular configuration consists essentially of two parts: an armature assembly and a field assembly separated from each other by a small air gap.

An armature assembly, in turn, consists of a stack 10 of laminations with a three-phase winding positioned in its slots 12. Such a stack 10 is shown in FIG. 1. A field assembly is a rectangular soft magnetic plate with the rectangular magnets of alternating polarities facing the air gap.

Slot openings 14 for the armature assembly are normally selected to be as small as possible to minimize cogging (detent) forces. FIG. 2 shows typical slot openings 14. However, a small slot opening limits the size of the wire that can be used for the winding. In addition, any machine winding process becomes more difficult as the slot opening 14 gets smaller.

Additionally, in order to attach an armature assembly to a mechanical structure, the top surface 16 of the stack 10 should have drilled and tapped holes. Since laminations are not suitable for such holes, locking wedges 18 with mounting holes are provided, as shown in FIG. 1. Once the laminations are punched with the slots 20 for these locking wedges 18, the distance between locking wedges becomes fixed and cannot be changed without re-tooling the punch for the laminations.

It is therefore desirable to have an armature assembly design which facilitates winding of coils, while also minimizing cogging forces. It is also desirable to have an armature assembly design in which attachment to mechanical structures is simplified yet flexible.

SUMMARY OF THE INVENTION

The above and other desirable features are provided by the present invention of an armature assembly design comprising a base portion, a plurality of teeth extending from the base portion and about which the windings can be positioned, and in which the plurality of teeth are spaced apart from each other to define slot openings at ends of and between adjacent teeth, and magnetic material shaped and positionable to enclose one or more of the slot openings between adjacent teeth.

In another embodiment of the armature assembly of the present invention includes a base portion, a plurality of teeth extending from the base portion and about which windings can be positioned, and magnetic material shaped to be positioned upon and extend beyond outer edges of the base portion.

In a further embodiment of the present invention, an armature assembly includes a base portion, a plurality of teeth extending from the base portion and about which windings can be positioned, and in which the plurality of teeth are spaced apart from each other so as to define slot openings at ends of and between adjacent teeth, and magnetic material in the shape of wedges which are fitted into notches formed in the adjacent teeth to enclose the slot openings between adjacent teeth.

The design goals and features of the present invention include the following:

1) to create totally open slots to make a machine winding process feasible;
2) to make possible insertion of coils, which have been individually wound on a bobbin, into the slots (around each tooth);
3) to minimize cogging forces by plugging up or closing the slot openings with magnetic wedges made either from solid soft magnetic material or from a stack of small trapezoidal-shaped laminations after the armature winding is inserted;
4) to provide mechanical means of attaching an armature assembly to a structure with the flexibility of changing the distance between the mounting holes without major re-tooling of the lamination punch.

These and other features and advantages of the present invention will be more readily understood upon consideration of the detailed description and accompanying drawings.

BRIEF DESCRIPTION OF THE DRAWINGS

FIG. 4 is an illustration of a portion of a stack assembly in which the slot openings of FIG. 3 have been plugged in accordance with one embodiment of the present invention.

FIGS. 5A and 5B illustrate a stack assembly including a mounting bracket in accordance with another embodiment of the present invention, and also illustrate the wedges of the embodiment of FIG. 4.

DETAILED DESCRIPTION OF THE INVENTION

Figure 1:
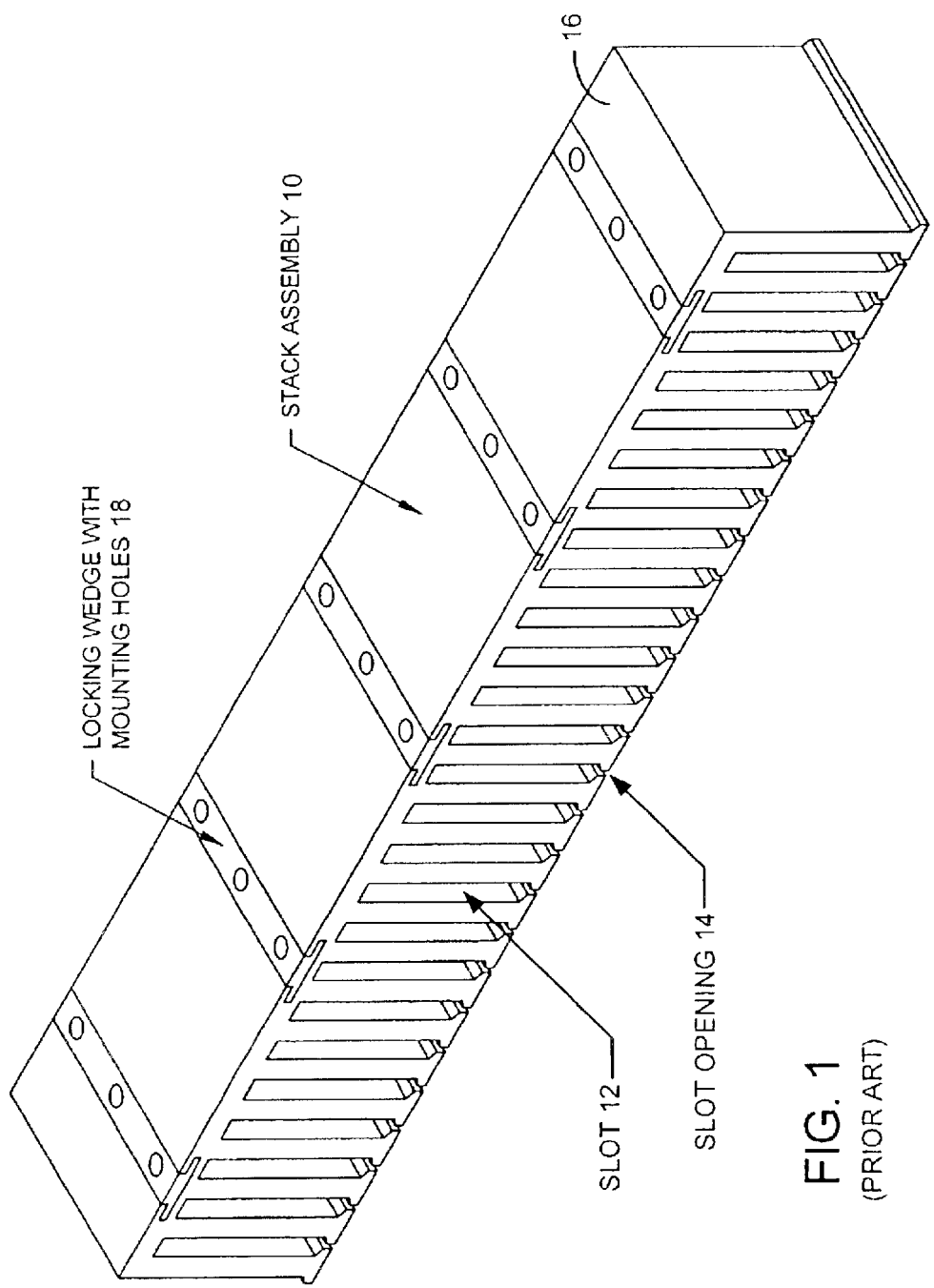
FIG. 1 is an illustration of a typical stack assembly in the prior art.
Figure 2:
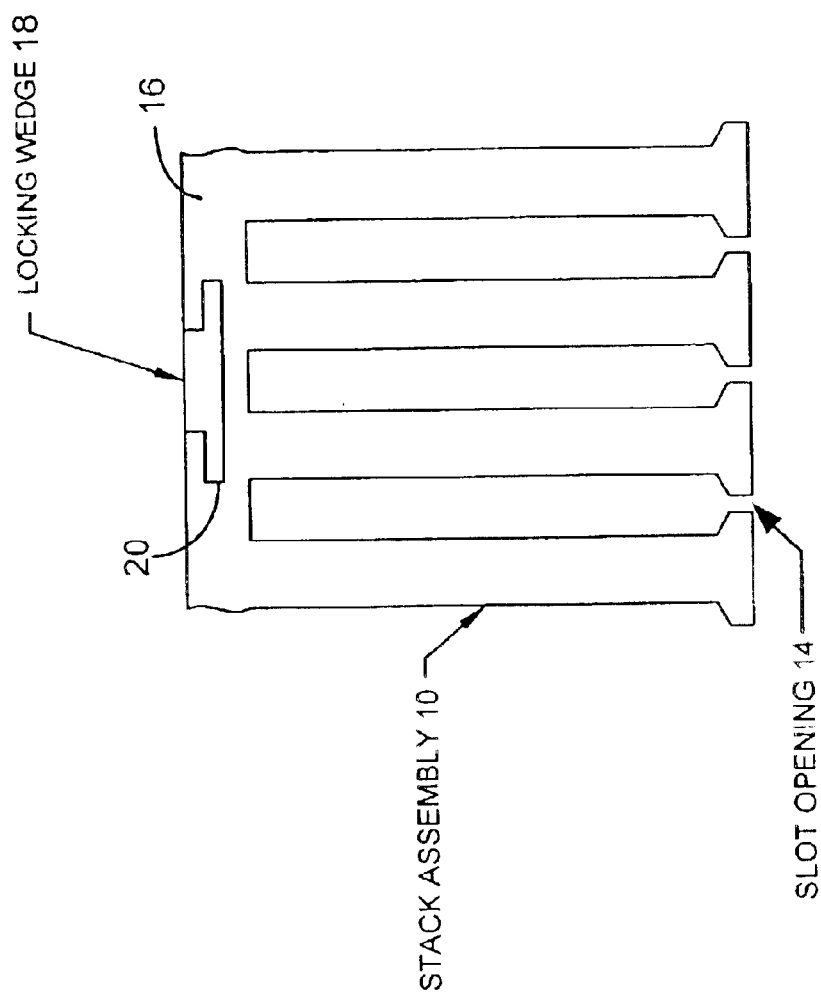
FIG. 2 is an illustration of a portion of a typical stack assembly in the prior art.
Figure 3:
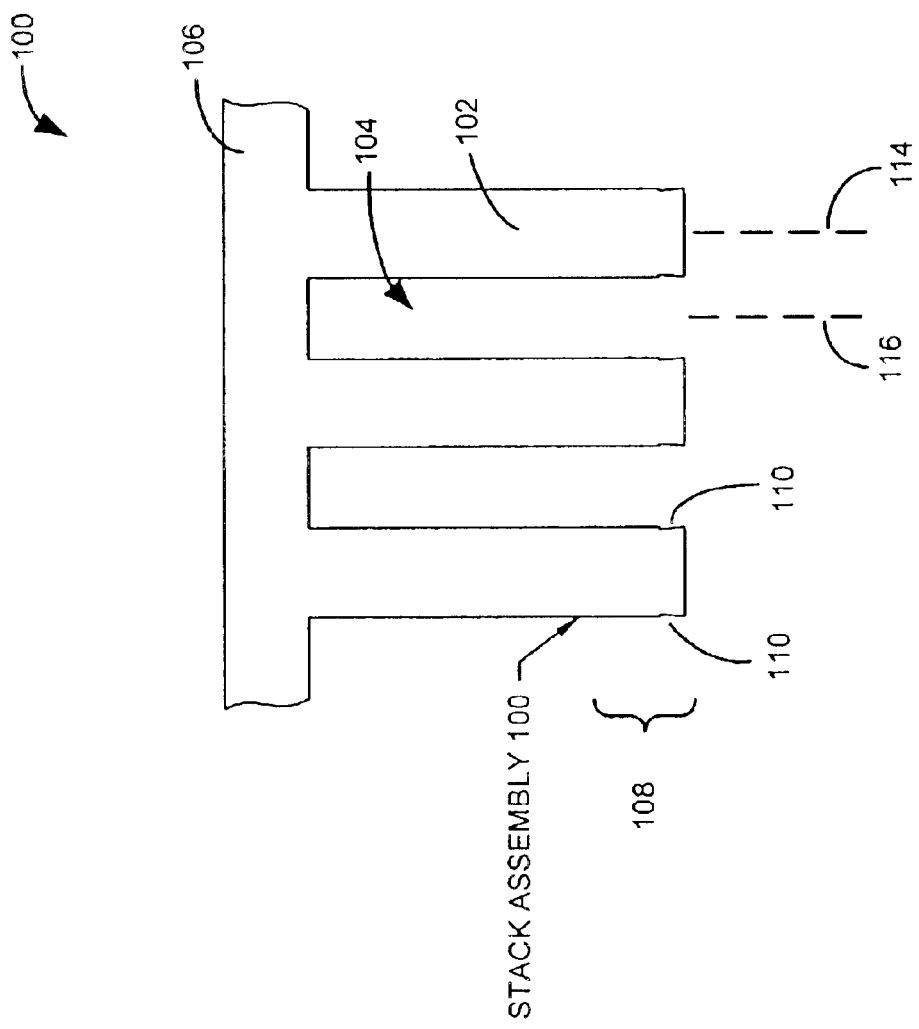
FIG. 3 is an illustration of a portion of a stack assembly in accordance with the present invention.

Referring now to FIG. 3, a portion of the stack assembly 100 of one embodiment of the present invention is illustrated. As can be seen from the figure, the teeth 102 of the stack extend outwardly from base portion 106. The width of the slots 104 separating teeth 102 is substantially the same from bottom (at the base portion 106) to top portion 108 (free ends of the teeth). This is in contrast to tooth designs of previous stack assemblies, for example in FIG. 2, in which the top end of the teeth flares outwardly to narrow the slot opening 14 between teeth.

According to the present invention, the top portion 108 of each tooth 102 has two additional notches 110, as can be seen in FIG. 3, to accommodate magnetic wedges 112, as illustrated in FIG. 4. The purpose of these magnetic wedges 112 is to minimize the difference in the air gap reluctance along the centerline 114 of a tooth 102 and the centerline 116 of a slot 104. The smaller this difference is, the lower the cogging force will be.

According to a further embodiment of the present invention, illustrated in FIGS. 5A and 5B, a composite armature assembly includes the stack assembly 100 with the winding (not shown), magnetic wedges 112 in the slots 104, and a mounting bracket 120 made from soft magnetic material. Preferably, mounting bracket 120 has a dimension along the longitudinal axis of stack assembly 100 which is greater than that of stack assembly 100, and has a thickness which is selected so that when combined with the thickness of base portion 106 of stack assembly 100, the total back iron thickness is sufficient to conduct magnetic flux. As can be seen from FIG. 5A, the width dimension (transverse to the longitudinal axis of stack assembly 100, is also preferably greater than the width dimension of the stack. Preferably a dovetail arrangement is employed which allows a precise fit between the stack assembly 100 and the mounting bracket 120.

This preferred dovetail arrangement is further illustrated in FIG. 5B. At the ends of stack 100 it can be seen that the base portion 106 has a surface which is angled outwardly in a direction toward the outer surface of base portion 106. It can also be seen that the ends of mounting bracket 120 have portions 122 and 124 which extend downwardly in the direction of teeth 102, and which have inner surfaces which are shaped to be compliments of the ends of base portion 106. In particular, the inner surfaces of portions 122 and 124 flare inwardly so that portions 122 and 124 capture the outwardly flared ends of base portion 106. While a dovetail arrangement has been disclosed as a preferred arrangement, it is to be understood that other arrangements can be used to position mounting bracket 120 on base portion 106 of stack assembly 100 within the spirit of the present invention.

Since not all of the back iron (base 106 and mounting bracket 120) is laminated in the embodiment of the invention shown in FIGS. 5A and 5B, there will be additional eddy current losses in the solid portion of the back iron (mounting bracket 120). However, the flux density in the solid portion of the back iron is relatively low because its cross-section is larger than that of the laminated portion (see FIG. 5B). Therefore, additional eddy current losses proportional to the (flux density)$^2$ will also be low.

With the configuration of the mounting bracket of the present invention there is no need for retooling of a lamination punch in order to accommodate changes in distance between mounting holes, and mounting hole configurations can be changed by replacing a single bracket instead of the multiple wedges of the prior art.

Figure 6:
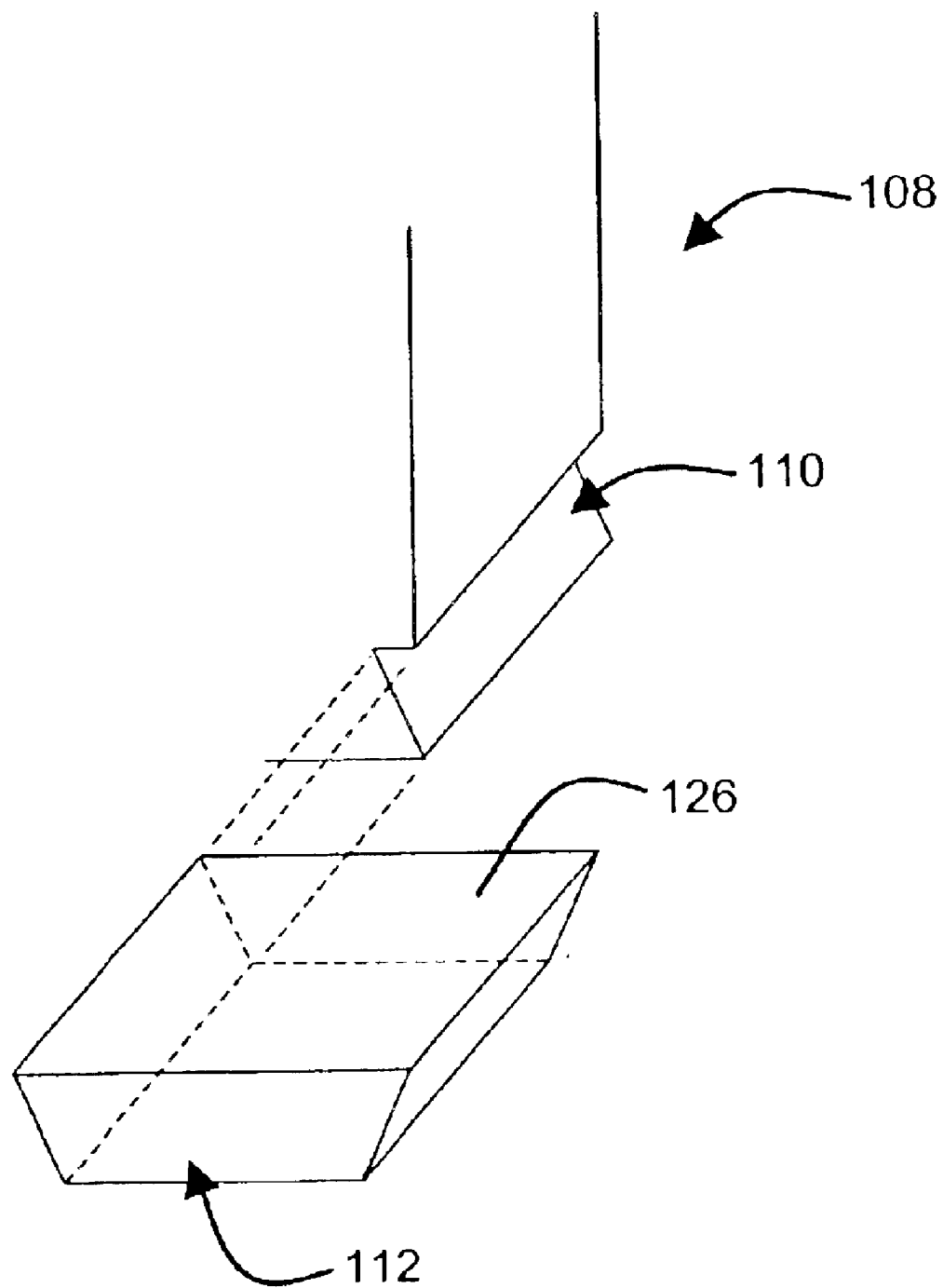
FIG. 6 is an enlarged view of a portion of a tooth and of a wedge in the stack of one embodiment of the present invention.

FIG. 6 is an expanded view of the relationship between the solid or laminated magnetic wedges 112 and the notches 110, which are formed in the top portion 108 of teeth 102 of the armature stack assembly 100 of the present invention. Preferably a dovetail arrangement is employed to provide a precise fit between teeth 102 and wedge 112. As can be seen from FIG. 6, wedge 112 is formed to have a trapezoidal cross section, with the length dimension for the wedge surface 126 which faces inwardly toward the windings (not shown) being larger than the length dimension for the surface which faces outwardly away from the windings. Notch 110, which is cut in top portion 108 of each tooth 102, is shaped to compliment the dimensions of wedge 112, so that a dovetail fit is achieved between notch 110 and wedge 112. It is to be noted that for the embodiment of FIG. 6, wedge 112 is sized so that the surface which faces outwardly, away from the windings, is substantially flush with the outwardly facing surface of tooth 102 when wedge 112 is in place in notch 110.

While a dovetail arrangement has been disclosed as a preferred arrangement, it is to be understood that other arrangements can be used to position wedge 112 between adjacent teeth 102 within the spirit of the present invention.

The terms and expressions which have been employed herein are intended as terms of description and not of limitation, and there is no intent in the use of such terms and expressions of excluding equivalents of the features shown and described, or portions thereof, it being recognized that various modifications are possible within the scope of the invention claimed.

What is claimed is:

1. An armature assembly including
   a plurality of windings;
   a base portion;
   a plurality of teeth extending from the base portion and about which the windings can be positioned; and
   a mounting bracket formed of magnetic material, and shaped to be detachably coupled to the base portion and to form a magnetic circuit with the base portion, plurality of teeth, and plurality of windings and to extend beyond outer edges of the base portion.

2. The armature assembly of claim 1, wherein the mounting bracket is coupled to the base portion of the armature assembly in a dovetail arrangement at opposite ends of the base portion.

3. The armature assembly of claim 1 wherein the base portion has a thickness and the mounting bracket has a thickness to create a combined cross-section sufficient to conduct magnetic flux at a relatively low flux density.

4. The armature assembly of claim 1, wherein the mounting bracket forms a solid portion of a back iron for the armature assembly.

5. The armature assembly of claim 1, wherein the mounting bracket has a cross section larger than a cross section of the base portion.

6. The armature assembly of claim 1, wherein the mounting bracket has a substantially solid cross section.

7. The armature assembly of claim 1, wherein the mounting bracket is formed of soft magnetic material.

8. A stack assembly for use in an armature assembly which includes a plurality of windings, the stack assembly comprising
   a base portion;
   a plurality of teeth extending from the base portion and about which the windings can be positioned; and
   a mounting bracket formed of magnetic material, and shaped to be detachably coupled to the base portion and to form a magnetic circuit with the base portion, plurality of teeth, and plurality of windings and to extend beyond outer edges of the base portion, wherein the mounting bracket has a cross section larger than a cross section of the base portion.

9. The stack assembly of claim 8, wherein the mounting bracket is coupled to the base portion of the armature assembly in a dovetail arrangement at opposite ends of the base portion.

10. The stack assembly of claim 8 wherein the base portion has a thickness and the mounting bracket has a thickness to create a combined cross-section sufficient to conduct magnetic flux at a relatively low flux density.

11. The stack assembly of claim 8, wherein the mounting bracket forms a solid portion of a back iron for the stack assembly.

12. The stack assembly of claim 8, wherein the mounting bracket has a substantially solid cross section.

13. The stack assembly of claim 8 wherein the mounting bracket is formed of soft magnetic material.

* * * * *

UNITED STATES PATENT AND TRADEMARK OFFICE
CERTIFICATE OF CORRECTION

PATENT NO. : 6,919,660 B2  
APPLICATION NO. : 10/116495  
DATED : July 19, 2005  
INVENTOR(S) : Mikhail Godkin Page 1 of 1

It is certified that error appears in the above-identified patent and that said Letters Patent is hereby corrected as shown below:

On the Title Page, Item (73) Assignee:  
Please replace "BEL Technologies, Inc." with "BEI Technologies, Inc."

Signed and Sealed this  
Fourteenth Day of October, 2014

Michelle K. Lee  
*Deputy Director of the United States Patent and Trademark Office*